United States Patent
Chang

(10) Patent No.: US 9,798,373 B2
(45) Date of Patent: Oct. 24, 2017

(54) CONTROLLING METHOD OF COMPUTER SCREEN AND COMPUTER SYSTEM USING THE SAME

(71) Applicant: Primax Electronics Ltd., Neihu, Taipei (TW)

(72) Inventor: Pei-Ming Chang, Taipei (TW)

(73) Assignee: PRIMAX ELECTRONICS LTD., Neihu, Taipei (TW)

( * ) Notice: Subject to any disclaimer, the term of this patent is extended or adjusted under 35 U.S.C. 154(b) by 541 days.

(21) Appl. No.: 14/515,018

(22) Filed: Oct. 15, 2014

(65) Prior Publication Data
US 2016/0034017 A1 Feb. 4, 2016

(30) Foreign Application Priority Data
Aug. 1, 2014 (TW) .............................. 103126440 A

(51) Int. Cl.
| G09G 1/00 | (2006.01) |
| G06F 1/32 | (2006.01) |
| G09G 5/00 | (2006.01) |
| G06T 7/90 | (2017.01) |

(52) U.S. Cl.
CPC .......... G06F 1/3218 (2013.01); G06F 1/3265 (2013.01); G06T 7/90 (2017.01); G09G 5/00 (2013.01); *G06T 2207/10016* (2013.01); *G06T 2207/10024* (2013.01); *G06T 2207/30196* (2013.01); *G09G 2330/021* (2013.01); *G09G 2330/022* (2013.01); *G09G 2354/00* (2013.01)

(58) Field of Classification Search
CPC .. G06F 7/04; G06F 21/32; G09G 5/34; G06T 7/40
See application file for complete search history.

(56) References Cited

U.S. PATENT DOCUMENTS

| 9,202,033 | B2 * | 12/2015 | Younkin | .................... G06T 7/90 |
| 2002/0097423 | A1 * | 7/2002 | Qiao | ...................... G06K 15/00 358/1.14 |
| 2008/0220829 | A1 * | 9/2008 | Akama | ............... H04W 52/027 455/574 |
| 2014/0160019 | A1 * | 6/2014 | Anda | ....................... G09G 5/00 345/158 |

* cited by examiner

*Primary Examiner* — Michael Faragalla
(74) *Attorney, Agent, or Firm* — Kirton McConkie; Evan R. Witt

(57) ABSTRACT

A controlling method of a computer screen includes the following steps. Firstly, in a step (a), an image is captured. Then, a step (b) detects whether the image has a skin color distribution region. If an accumulative time length that no skin color distribution region is contained in the image is longer than a predetermined time length, a hibernation mode of the computer screen is enabled.

13 Claims, 5 Drawing Sheets

CONTROLLING METHOD OF COMPUTER SCREEN AND COMPUTER SYSTEM USING THE SAME

FIELD OF THE INVENTION

The present invention relates to a controlling method, and more particularly to a controlling method of a computer screen.

BACKGROUND OF THE INVENTION

With rapid development of electronic and information industries, computers become essential tools in our daily lives. For example, computers can be used to process data in order to simplify and accelerate the work. Moreover, computers can be used to provide video entertainments. In addition, computers can be connected to the internet to acquire information.

Generally, a power management program is installed in the computer. The time parameters of the power management program in the computer may be adjusted by the user according to the usual practice or the work characteristics of the user. For example, the time parameters include the waiting time of activating a screen saver, the waiting time of turning off the computer screen, the waiting time of entering the system standby, the waiting time of entering the system hibernation and so on. Consequently, after the computer has been idled for a certain time period, the computer enters a power-saving mode.

However, the above power management mechanism is not user-friendly. For example, while an application program of the computer is executed to play a multimedia file or a streaming media data is watched through the internet, the mouse or the keyboard of the computer is usually not used. If the mouse or the keyboard has not been used for a long time, the computer may enter the power-saving mode. For example, in the power-saving mode, the screen saver may be activated. Under this circumstance, the mood of the user to enjoy the multimedia file or the streaming media data is suddenly interrupted. For continuously playing the multimedia file or watching the streaming media data, the user has to move the mouse or press a key of the keyboard.

For solving the above drawbacks, the user may deliberately set a longer waiting time as the time parameter of the power management program or disable the power-saving function. However, after the playback of the multimedia file or the streaming media data is ended, the user usually forgets to set the time parameter of the power management program to the original status or forgets to re-enable the power-saving function.

Accordingly, a power-saving method of a computer is disclosed in Taiwanese Patent No. 413896 for example. In accordance with this power-saving method, an image pickup device is used to capture an image in front of the computer. According to the image, the computer may judge whether the user is in front of the computer. If the user is not in front of the computer to operate the computer, the power-saving function computer is enabled so as to achieve the power-saving purpose. Consequently, even if the work characteristics of different users are different, it is not necessary to adjust the time parameter of the power management program in the computer.

Moreover, in the above power-saving method, the computer may analyze whether there is any facial feature (e.g. an eye, a nose or a mouth) in the image captured by the image pickup device. According to the analyzing result, the computer judges whether the user is in front of the computer. However, since the face recognition technology requires a huge computation data amount, the computing loading of the computer is increased. Moreover, regardless of whether the user is in front of the computer, the computer has to continuously perform the face recognition on the image which is captured by the image pickup device. Under this circumstance, the power-saving purpose fails to be achieved. In other words, the conventional controlling method of the computer screen needs to be further improved.

SUMMARY OF THE INVENTION

An object of the present invention provides a controlling method of a computer screen for recognizing the skin color of an image captured by an image pickup device and judging whether the user is at an operating position of a computer system according to the skin color recognition. According to the judging result, the hibernation mode of the computer screen is selectively enabled.

Another object of the present invention provides a computer system using the above controlling method.

In accordance with an aspect of the present invention, there is provided a controlling method of a computer screen. Firstly, in a step (a), an image is captured. Then, a step (b) detects whether the image has a skin color distribution region. If an accumulative time length that no skin color distribution region is contained in the image is longer than a predetermined time length, a hibernation mode of the computer screen is enabled.

In accordance with another aspect of the present invention, there is provided a computer system. The computer system includes a computer screen, an image pickup device, a detecting unit and a driving unit. The image pickup device captures an image. The detecting unit is in communication with the image pickup device. The detecting unit detects whether the image has a skin color distribution region. The driving unit is in communication with the detecting unit. If an accumulative time length that no skin color distribution region is contained in the image is longer than a predetermined time length, a hibernation mode of the computer screen is enabled by the driving unit.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
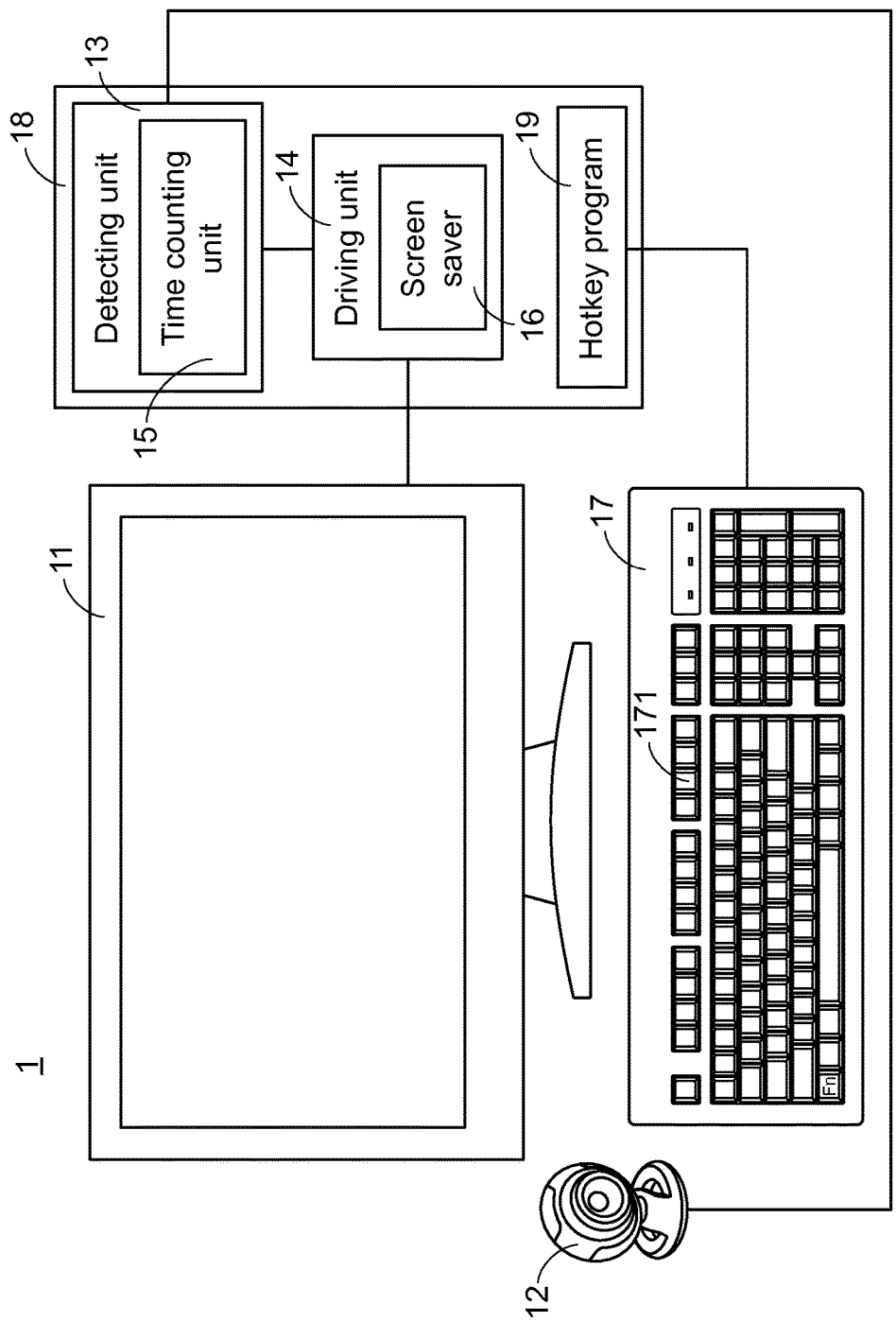
FIG. 1 schematically illustrates the architecture of a computer system according to an embodiment of the present invention.

FIG. 1 schematically illustrates the architecture of a computer system according to an embodiment of the present invention. As shown in FIG. 1, the computer system 1 comprises a computer host 18, a computer screen 11, an input device 17 and an image pickup device 12. The computer host 18 comprises a detecting unit 13, a driving unit 14, a time counting unit 15 and a screen saver 16. The image pickup device 12 is used for capturing an image in front of the computer system 1. The detecting unit 13 is connected between the image pickup device 12 and the driving unit 14. The detecting unit 13 is used for detecting whether an image captured by the image pickup device 12 has a skin color distribution region. Moreover, according to the detecting result of the detecting unit 13, the driving unit 14 may selectively enable the hibernation mode of the computer screen 11.

Figure 2:
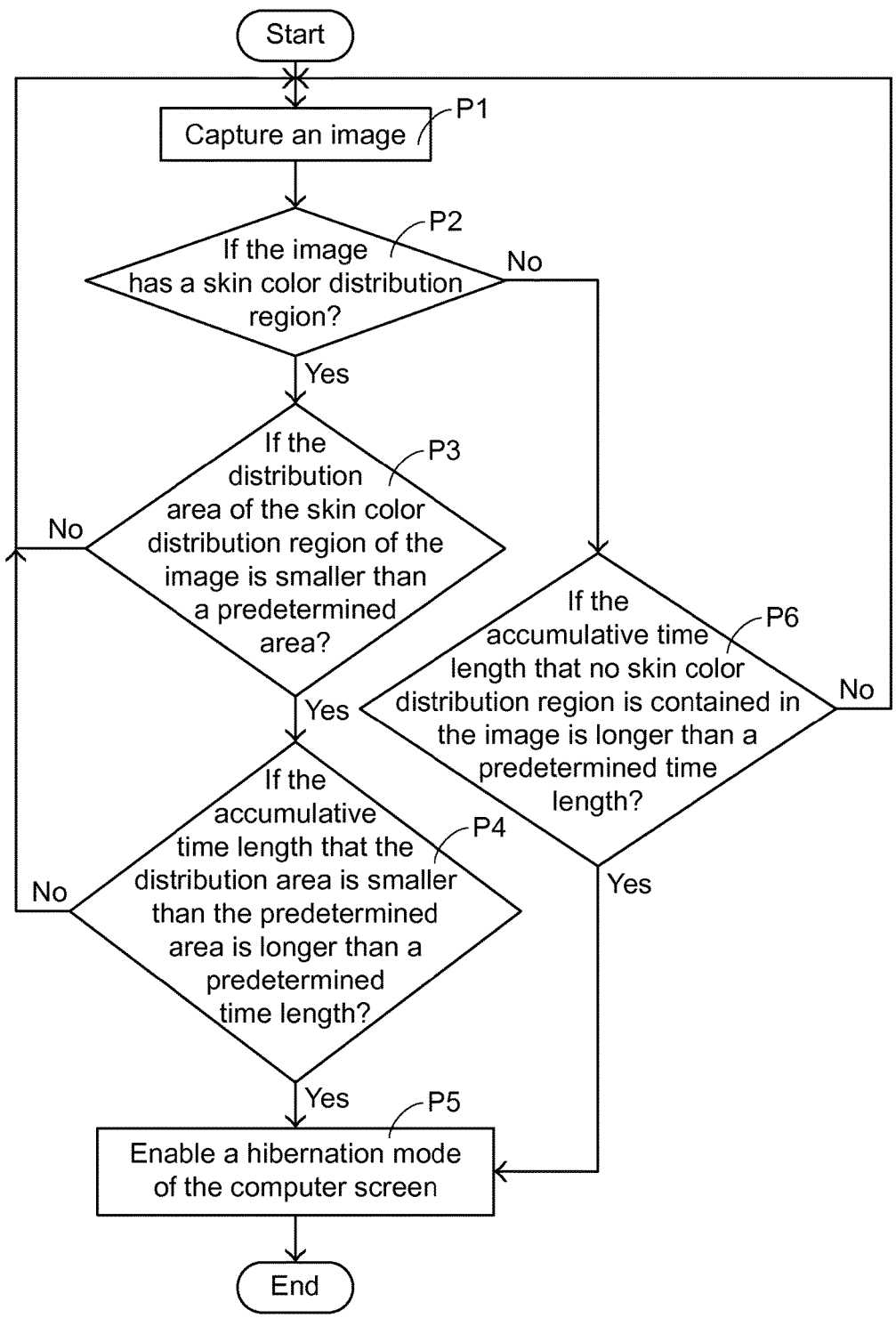
FIG. 2 is a flowchart illustrating a controlling method of a computer screen according to a first embodiment of the present invention.

Hereinafter, a controlling method of a computer screen will be illustrated with reference to FIG. 2. FIG. 2 is a flowchart illustrating a controlling method of a computer screen according to a first embodiment of the present invention. Firstly, in a step P1, an image in front of the computer system 1 is captured by the image pickup device 12. Then, in a step P2, the detecting unit 13 detects whether the image captured by the image pickup device 12 has a skin color distribution region. If the image has the skin color distribution region, a step P3 is performed. If the image has no skin color distribution region, a step P6 is performed.

In the step P6, the time counting unit 15 counts the accumulative time length that no skin color distribution region is contained in the image captured by the image pickup device 12. If the accumulative time length is shorter than a predetermined time length, it is inferred that the user is temporarily departed from an operating position of the computer system 1 and returned to the operating position of the computer system 1 within the predetermined time length. Consequently, the step P1 is repeatedly done. Whereas, if the accumulative time length is longer than the predetermined time length, it is inferred that the user is departed from the operating position of the computer system 1 for a time period longer than the predetermined time length. Then, a step P5 is performed. That is, the hibernation mode of the computer screen 11 is enabled.

In the step P3, the detecting unit 13 calculates the distribution area of the skin color distribution region of the image which is captured by the image pickup device 12. If the distribution area of the skin color distribution region is larger than a predetermined area, it is inferred that the user is at the operating position of the computer system 1. Consequently, the step P1 is repeatedly done. Whereas, if the distribution area of the skin color distribution region of the image captured by the image pickup device 12 is smaller than the predetermined area, it is inferred that the user is departed from the operating position of the computer system 1. Then, a step P4 is performed.

In the step P4, the time counting unit 15 counts the accumulative time length that the distribution area of the skin color distribution region is smaller than the predetermined area. If the accumulative time length is shorter than a predetermined time length, it is inferred that the user is temporarily departed from an operating position of the computer system 1 and returned to the operating position of the computer system 1 within the predetermined time length. Consequently, the step P1 is repeatedly done. Whereas, if the accumulative time length is longer than the predetermined time length, it is inferred that the user is departed from the operating position of the computer system 1 for a time period longer than the predetermined time length. Then, the step P5 is performed. That is, the hibernation mode of the computer screen 11 is enabled.

In this embodiment, the skin color in an YCbCr color space is recognized by the detecting unit 13. For example, the detecting unit 13 may recognize whether the image captured by the image pickup device 12 contains a blue-difference chroma component (Cb) of the YCbCr color space in the range between 97.5 and 142.5 and a red-difference chroma component (Cr) of the YCbCr color space in the range between 134 and 176. According to the recognizing result, the detecting unit 13 judges whether there is a skin color distribution region. In particular, if the image captured by the image pickup device 12 contains the blue-difference chroma component (Cb) of the YCbCr color space in the range between 97.5 and 142.5 and the red-difference chroma component (Cr) of the YCbCr color space in the range between 134 and 176, the detecting unit 13 judges that the image has the skin color distribution region. The above ranges of the coefficients Cb and Cr are determined according to the known report, which was described by Hiremath in 2006. This report is well known to those skilled in the art, and is not redundantly described herein. Moreover, the above method of recognizing the skin color by the detecting unit 13 is presented herein for purpose of illustration and description only.

Moreover, when the computer screen 11 is in the hibernation mode, the computer screen 11 is protected by the screen saver 16 or the computer screen 11 is turned off, but is not limited thereto. Moreover, when the computer screen 11 is in the hibernation mode, the image pickup device 12 and the detecting unit 13 are still enabled. Once the detecting unit 13 detects that the image captured by the image pickup device 12 has the skin color distribution region again and the distribution area of the skin color distribution region is larger than the predetermined area, the computer screen 11 is no longer in the hibernation mode.

In this embodiment, the computer system 1 further comprises a hotkey program 19, the input device 17 is a keyboard, and the input device 17 is equipped with a power-saving hotkey 171 corresponding to the hotkey program 19. When the power-saving hotkey 171 is triggered, the image pickup device 12 and the detecting unit 13 are enabled by the hotkey program 19. That is, the computer screen controlling method as described in FIG. 2 may be selectively activated according to the practical requirements of the user.

Figure 3:
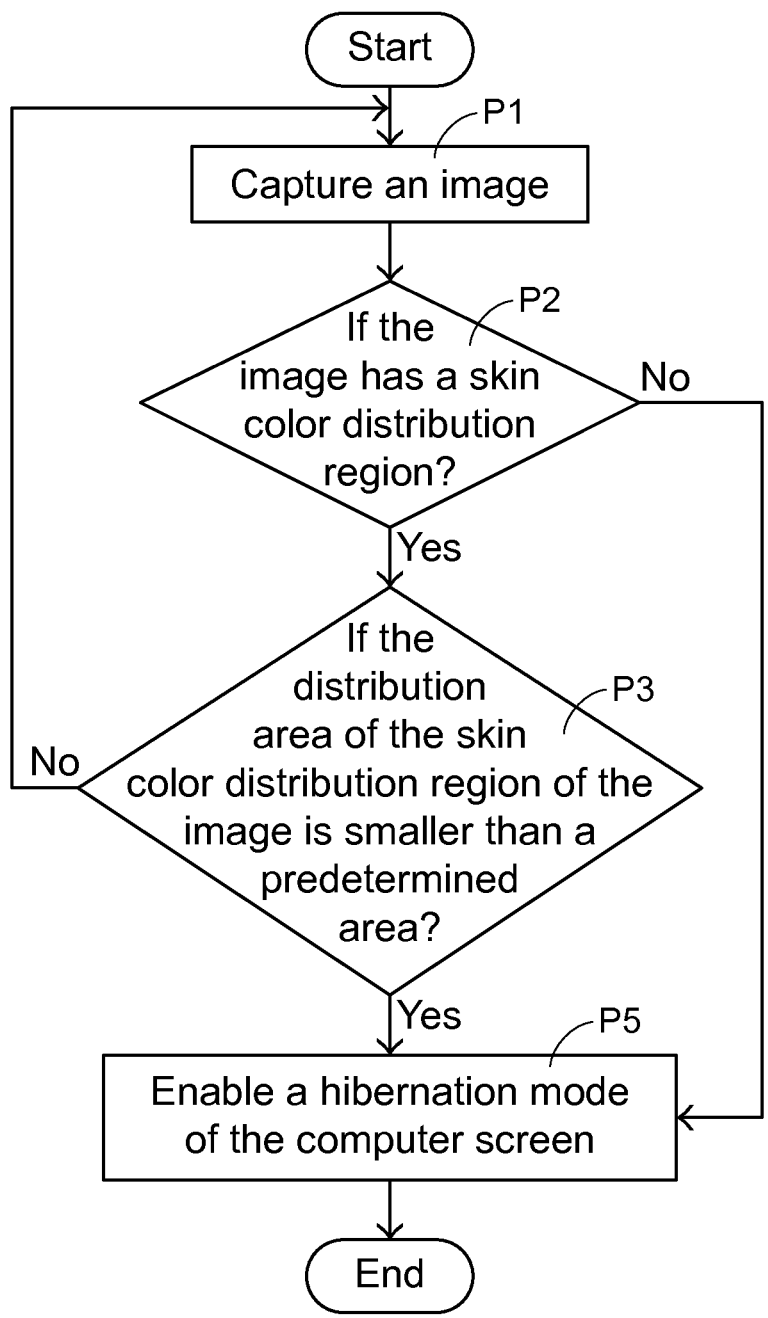
FIG. 3 is a flowchart illustrating a controlling method of a computer screen according to a second embodiment of the present invention.

FIG. 3 is a flowchart illustrating a controlling method of a computer screen according to a second embodiment of the present invention. Except that the computer screen controlling method of this embodiment does not comprise the steps P4 and P6, the other steps of the computer screen controlling method of this embodiment are similar to those of the first embodiment, and are not redundantly described herein. That is, the predetermined time length as described in the first embodiment is zero. Once the detecting unit 13 detects that the image captured by the image pickup device 12 has no skin color distribution region, the hibernation mode of the computer screen 11 is enabled immediately. Moreover, once the detecting unit 13 detects that the distribution area of the skin color distribution region is smaller than the predetermined area, the hibernation mode of the computer screen 11 is enabled immediately.

Figure 4:
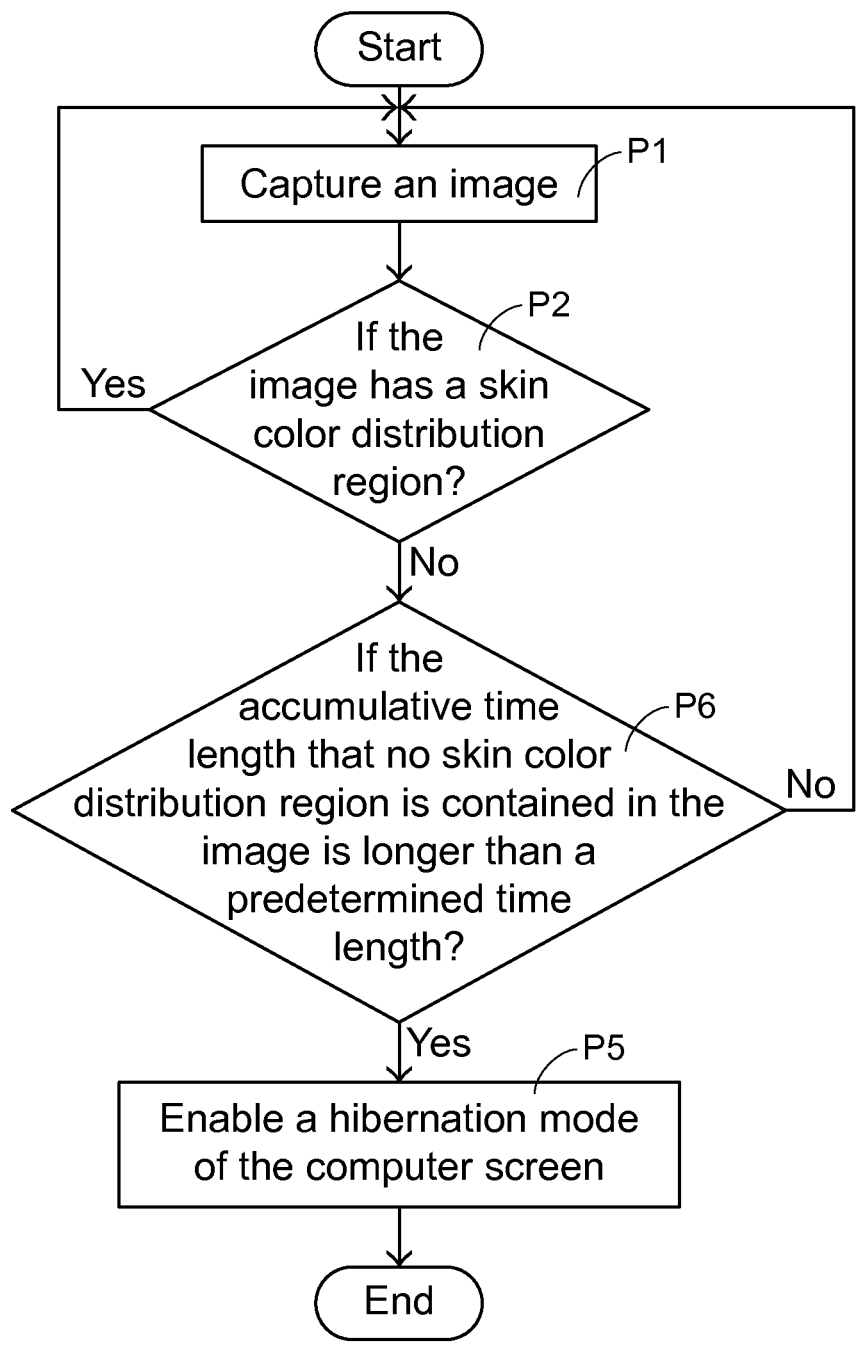
FIG. 4 is a flowchart illustrating a controlling method of a computer screen according to a third embodiment of the present invention.

FIG. 4 is a flowchart illustrating a controlling method of a computer screen according to a third embodiment of the present invention. Except that the computer screen controlling method of this embodiment does not comprise the steps P3 and P4, the other steps of the computer screen controlling method of this embodiment are similar to those of the first embodiment, and are not redundantly described herein. That is, once the detecting unit 13 detects that the image captured by the image pickup device 12 has a skin color distribution region, the step P1 is repeatedly done.

Figure 5:
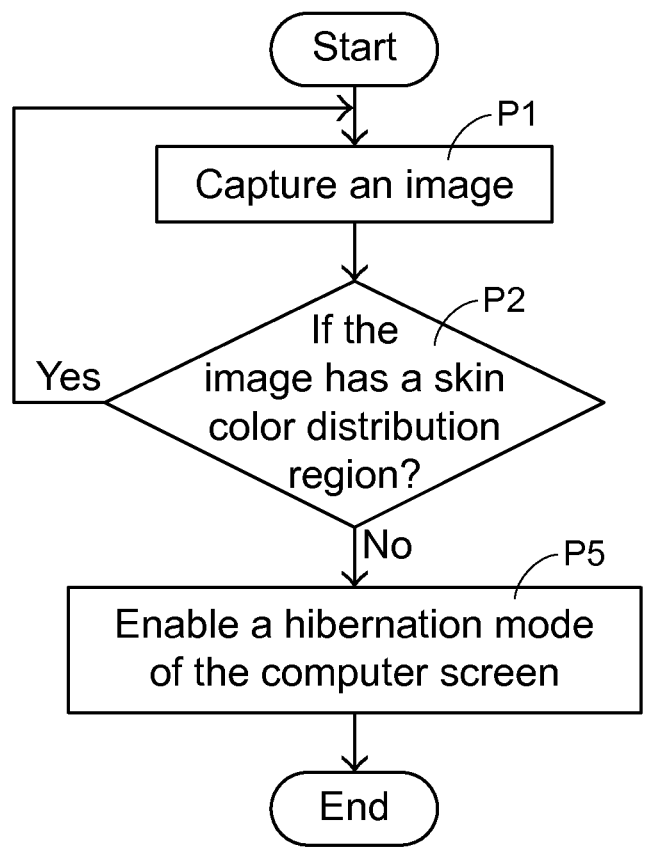
FIG. 5 is a flowchart illustrating a controlling method of a computer screen according to a fourth embodiment of the present invention.

FIG. 5 is a flowchart illustrating a controlling method of a computer screen according to a fourth embodiment of the present invention. Except that the computer screen controlling method of this embodiment does not comprise the step P6, the other steps of the computer screen controlling method of this embodiment are similar to those of the third embodiment, and are not redundantly described herein. That is, once the detecting unit 13 detects that the image captured by the image pickup device 12 has no skin color distribution region, the hibernation mode of the computer screen 11 is enabled immediately.

From the above descriptions, the present invention provides a controlling method of a computer screen for recognizing the skin color of an image captured by an image pickup device and judging whether the user is at an operating position of a computer system according to the skin color recognition. According to the judging result, the hibernation mode of the computer screen is selectively enabled. As previously described, since the conventional face recognition technology requires a huge computation data amount, the computing loading of the computer is very high. In comparison with the conventional face recognition technology, the computer screen controlling method of the present invention requires less computation data amount and is more power-saving. Consequently, the computer screen controlling method of the present invention has industrial values.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A controlling method of a computer screen, comprising steps of:
    (a) capturing an image; and
    (b) detecting whether the image has a skin color distribution region, wherein if an accumulative time length that no skin color distribution region is contained in the image is longer than a predetermined time length, a hibernation mode of the computer screen is enabled, wherein the step (b) further comprises a step of recognizing whether the image contains a blue-difference chroma component Cb of a YCbCr color space in the range between 97.5 and 142.5 and a red-difference chroma component Cr of the YCbCr color space in the range between 134 and 176, wherein if the image contains the blue-difference chroma component Cb of the YCbCr color space in the range between 97.5 and 142.5 and the red-difference chroma component Cr of the YCbCr color space in the range between 134 and 176, the image has the skin color distribution region.

2. The controlling method according to claim 1, wherein if the image has no skin color distribution region, the step (b) further comprises steps of:
    (b1) counting the accumulative time length that no skin color distribution region is contained in the image; and
    (b2) if the accumulative time length is longer than the predetermined time length, enabling the hibernation mode of the computer screen.

3. The controlling method according to claim 2, wherein the predetermined time length is zero.

4. The controlling method according to claim 1, wherein if the image has the skin color distribution region, the step (b) further comprises steps of:
    (b1) calculating a distribution area of the skin color distribution region of the image; and
    (b2) if the distribution area of the skin color distribution region is smaller than a predetermined area, enabling the hibernation mode of the computer screen.

5. The controlling method according to claim 1, wherein if the image has the skin color distribution region, the step (b) further comprises steps of:
    (b1) calculating a distribution area of the skin color distribution region of the image;
    (b2) counting an accumulative time length that the distribution area of the skin color distribution region is smaller than the predetermined area; and
    (b3) if the accumulative time length is longer than the predetermined time length, enabling the hibernation mode of the computer screen.

6. The controlling method according to claim 1, wherein when the computer screen is in the hibernation mode, the computer screen is protected by a screen saver or the computer screen is turned off.

7. A computer system, comprising:
    a computer screen;
    an image pickup device capturing an image;
    a detecting unit in communication with the image pickup device, wherein the detecting unit detects whether the image has a skin color distribution region, wherein if the detecting unit recognizes that the image contains a blue-difference chroma component Cb of a YCbCr color space in the range between 97.5 and 142.5 and a red-difference chroma component Cr of the YCbCr color space in the range between 134 and 176, the detecting unit judges that the image has the skin color distribution region; and
    a driving unit in communication with the detecting unit, wherein if an accumulative time length that no skin color distribution region is contained in the image is longer than a predetermined time length, a hibernation mode of the computer screen is enabled by the driving unit.

8. The computer system according to claim 7, further comprising a time counting unit, wherein the time counting unit counts the accumulative time length that no skin color distribution region is contained in the image, wherein if the accumulative time length is longer than the predetermined time length, the hibernation mode of the computer screen is enabled by the driving unit.

9. The computer system according to claim 8, wherein the predetermined time length is zero.

10. The computer system according to claim 7, wherein if the image has the skin color distribution region, the detecting unit further calculates a distribution area of the skin color distribution region of the image, wherein if the distribution area of the skin color distribution region is smaller than a predetermined area, the hibernation mode of the computer screen is enabled by the driving unit.

11. The computer system according to claim 7, wherein if the image has the skin color distribution region, the detecting unit further calculates a distribution area of the skin color distribution region of the image, wherein the computer system further comprises a time counting unit, and the time counting unit counts an accumulative time length that no skin color distribution region is contained in the image, wherein if the distribution area of the skin color distribution region is smaller than a predetermined area and the accumulative time length that no skin color distribution region is contained in the image is longer than the predetermined time length, the hibernation mode of the computer screen is enabled by the driving unit.

12. The computer system according to claim 7, further comprising a screen saver, wherein when the computer screen is in the hibernation mode, the computer screen is protected by the screen saver or the computer screen is turned off.

13. The computer system according to claim 7, further comprising an input device and a hotkey program, wherein the input device is equipped with a power-saving hotkey, wherein when the power-saving hotkey is triggered, the image pickup device and the detecting unit are enabled by the hotkey program.

* * * * *